US007802913B2

(12) United States Patent
Tsai

(10) Patent No.: US 7,802,913 B2
(45) Date of Patent: Sep. 28, 2010

(54) LED LAMP INCLUDING POSITIONING FRAME FOR GENERAL ILLUMINATION

(75) Inventor: Tzung-Shiun Tsai, Kaohsiung (TW)

(73) Assignee: Teamwin Opto-Electronics Co., Ltd., Kaohsiung (TW)

( * ) Notice: Subject to any disclaimer, the term of this patent is extended or adjusted under 35 U.S.C. 154(b) by 161 days.

(21) Appl. No.: 12/141,127

(22) Filed: Jun. 18, 2008

(65) Prior Publication Data

US 2009/0316396 A1 Dec. 24, 2009

(51) Int. Cl.
*F21V 7/10* (2006.01)
*F21V 7/20* (2006.01)
*G02F 1/13357* (2006.01)

(52) U.S. Cl. ....................... 362/632; 362/612; 362/633; 362/634; 362/559; 349/65

(58) Field of Classification Search ................. 362/612, 362/613, 624, 625, 630, 631, 632, 633, 634, 362/26, 27, 555, 559; 349/65
See application file for complete search history.

(56) References Cited

U.S. PATENT DOCUMENTS 5,381,309 A * 1/1995 Borchardt ................... 362/612
5,727,862 A * 3/1998 Wu ............................ 362/27
5,741,058 A * 4/1998 Suzuki et al. ................. 362/27
6,000,812 A * 12/1999 Freeman et al. ........ 362/249.01
6,065,845 A * 5/2000 Miyazaki ...................... 362/26
7,344,294 B2 * 3/2008 Hsieh et al. ................. 362/633
7,445,368 B2 * 11/2008 Huang et al. ................ 362/609
7,458,711 B2 * 12/2008 Cheng ........................ 362/621
2002/0043012 A1 * 4/2002 Shibata et al. ................ 40/546
2005/0254258 A1 * 11/2005 Lee ............................ 362/612
2006/0044828 A1 * 3/2006 Kim et al. ................... 362/613
2007/0195551 A1 * 8/2007 Shin ........................... 362/612
2009/0086505 A1 * 4/2009 Iwasaki et al. .............. 362/612

* cited by examiner

*Primary Examiner*—Ismael Negron

(57) ABSTRACT

An LED lamp includes a positioning frame base, LED bars, a light guide plate, a reflection sheet, an optical film, a power supply unit and a protective cover. The LED bars and the light guide plate are disposed at the inner side of the positioning frame base; the reflection sheet is stuck on one side of the light guide plate; the optical film is disposed on the other side of the light guide plate, and the protective cover is disposed over the optical film. The power supply unit is installed at the rear side of the positioning frame base for converting and supplying steady DC power for the LED bars. Different types of optical films can be selected for adjusting the lighting angles of the LED bars.

11 Claims, 8 Drawing Sheets

LED LAMP INCLUDING POSITIONING FRAME FOR GENERAL ILLUMINATION

BACKGROUND OF THE INVENTION

1. Field of the Invention

This invention relates to a high-efficiency LED lamp, particularly to one employed for indoor illumination, which is able to concentrate light and increase lighting efficacy.

2. Description of the Prior Art

Generally, an LED (light-emitting diode) has many special features, such as low power consumption, power savings, a long service life, a simple operation and the beneficial results of being environmentally friendly.

Conventional lamps, such as tube lamps and lamp bulbs, are extensively employed in various places for lighting, but the working efficiency of conventional lamps can hardly reach a maximum, in other words, conventional lamps are likely to consume too much power for lighting, squandering much electric power and increasing costs when used for long periods of time.

In addition, a conventional lamp generally radiates light directly and thus the light is likely to scatter about in the space. Therefore, when the lamp is installed at a comparatively high location, the lighting angle of the lamp will become comparatively large and cause light diffusion and as a result, the light produced by the lamp cannot be concentrated on an object or a place for lighting, making it impossible to provide light with sufficient brightness.

SUMMARY OF THE INVENTION

The objective of this invention is to offer a high-efficiency LED lamp that is simple in structure, and that has a high working efficacy and excellent lighting effects.

The high-efficiency LED lamp in the present invention includes a positioning frame base, LED bars, a light guide plate and a power supply unit. The positioning frame base consists of a fixing frame and a base plate. The fixing frame is a rectangular frame having peripheral edge portions bent inwardly forming two opposite first sheets and two opposite second sheets, the fixing frame forming a cavity. Each second plate has an edge portion bent outwardly forming a combining member. The base plate is a rectangular plate positioned on the inner side of the fixing frame and has its peripheral edge portions bent toward one side to form a narrow sheet, so that the side surface forms an accommodating space. The LED bar is formed by installing a plurality of LEDs on a basic plate and attached to the inner side of the sheet of the base plate using a heat conductive medium. The light guide plate is received in the accommodating space of the base plate and positioned at locations where the LED bars are positioned. The power supply unit is provided with a distributor at the rear side of the base plate of the positioning frame base for receiving and properly shunting AC/DC power. The distributor is connected to a DC conversion circuit for outputting DC power to the LED bars. In addition, an optical film is disposed on the light guide face of the light guide plate, which is able to be arranged in different modes for adjusting the lighting angles of the LEDs.

With the above design, the DC conversion device can supply DC power for the LEDs and the optical film can be arranged in different modes for adjusting the lighting angles of the LEDs; therefore, the LED lamp of this invention has a high working efficacy and excellent lighting effects.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
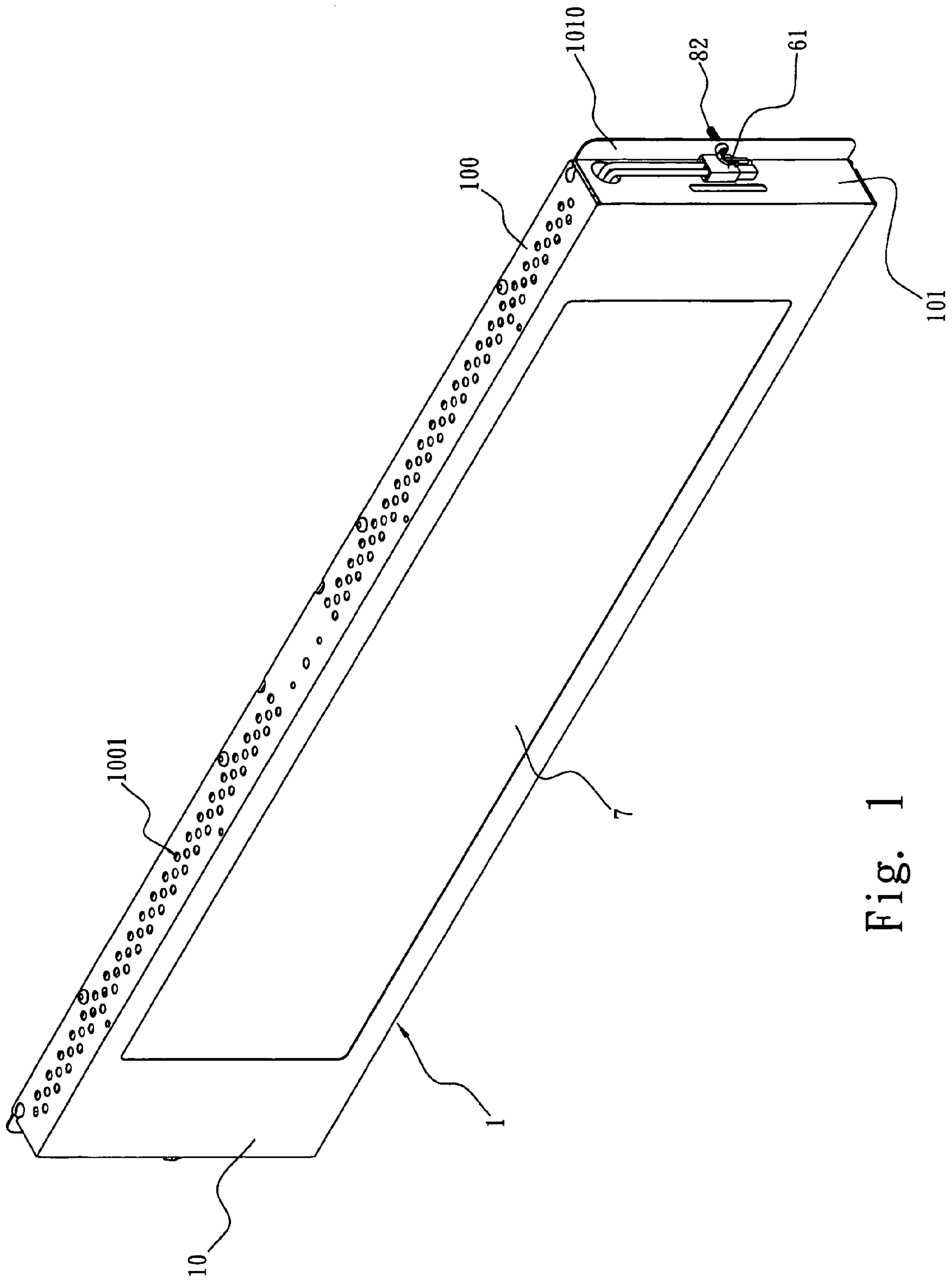
FIG. 1 is a perspective view of a high efficiency LED lamp of the present invention.
Figure 2:
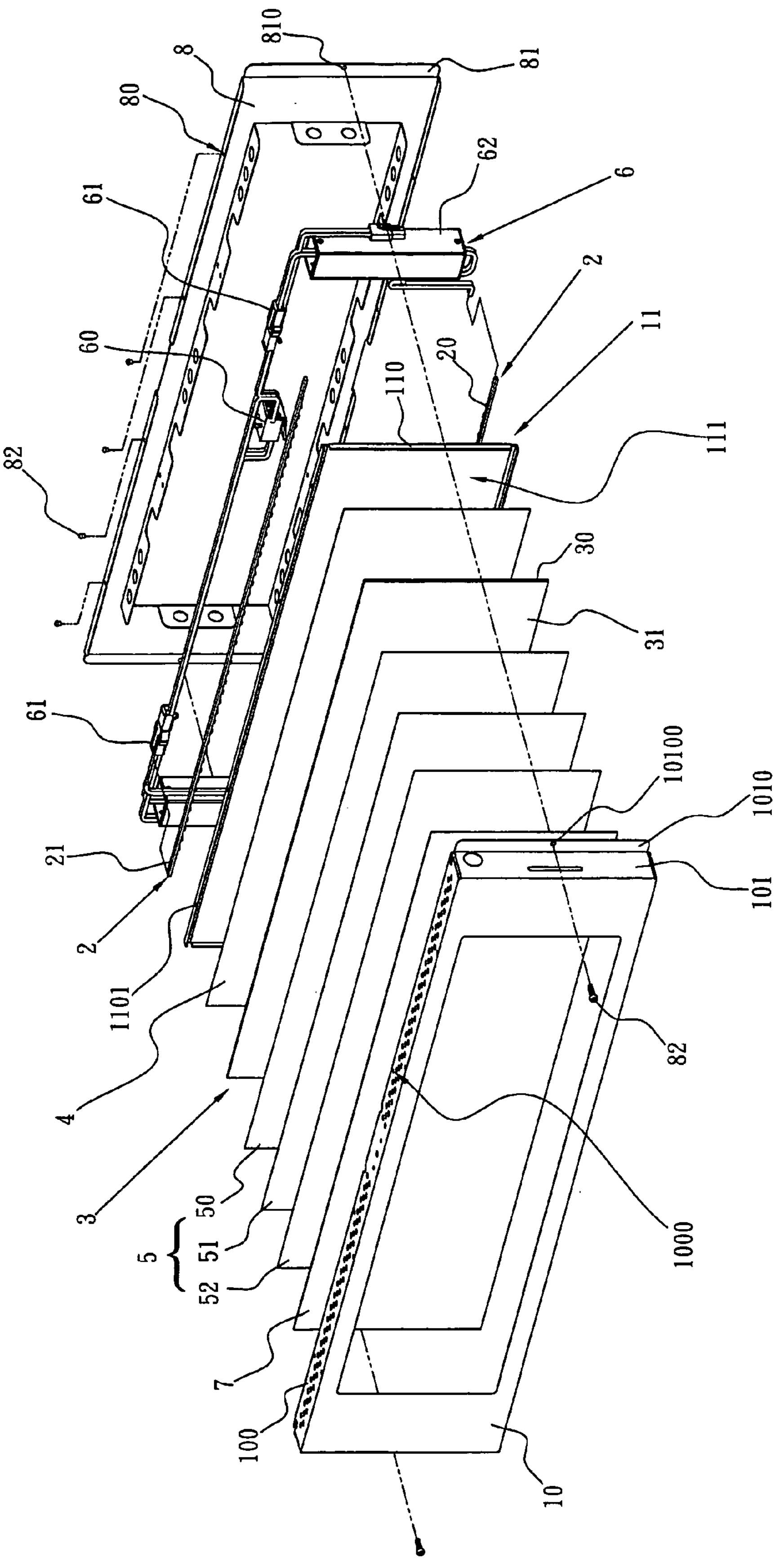
FIG. 2 is an exploded perspective view of a high efficiency LED lamp of the present invention.
Figure 3A:
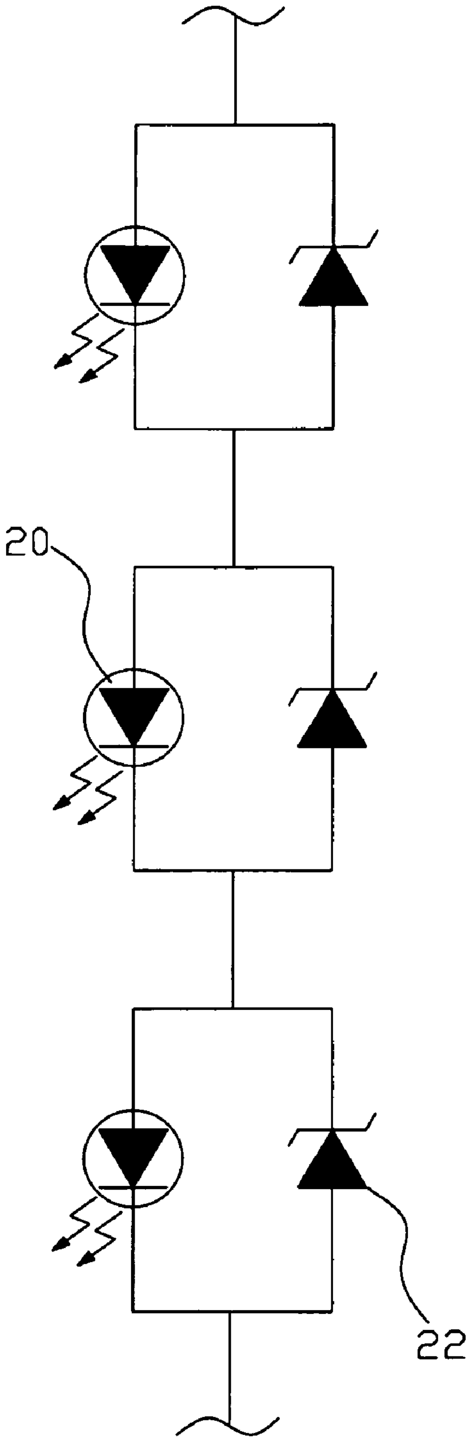
FIG. 3A is a first circuit diagram of LEDs connected in series in the present invention.
Figure 3B:
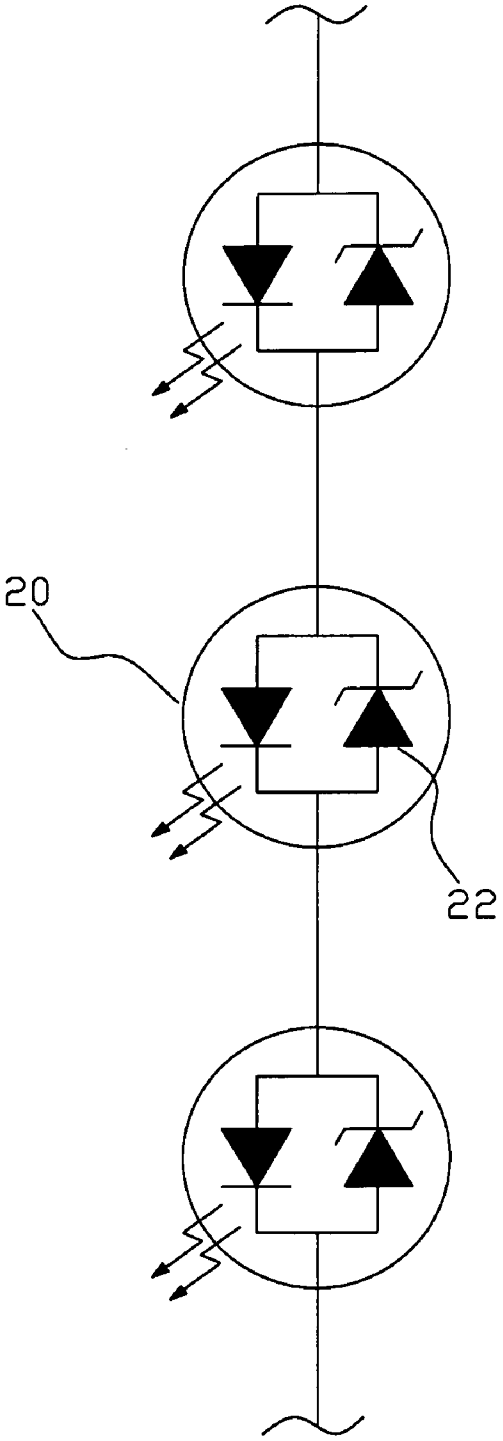
FIG. 3B is a second circuit diagram of the LEDs connected in series in the present invention.

A preferred embodiment of a high efficiency LED lamp of the present invention, as shown in FIGS. 1, 2, 3A and 3B, includes a positioning frame base 1, two LED bars 2, a light guide plate 3, a reflection sheet 4, an optical film 5, a power supply unit 6, a protective cover 7 and an integration frame 8 combined together.

The positioning frame base 1 consists of a fixing frame 10 and a base plate 11. The fixing frame 10 is rectangular, made of galvanized iron, spongy iron aluminum-magnesium alloy, Teflon, carbon, or plastic material like acrylics, polyvinyl chloride (PVC) or polypropylene (P.P.), and shaped by sheeting, casting or by plastic injection molding and formed with a thickness between 0.2 mm and 1 mm. The fixing frame 10 has its peripheral edge extending inwardly perpendicularly, forming two opposite first sheets 100 and two opposite second sheets 101, providing the fixing frame 10 a cavity. The two opposite first sheets 100 respectively have their side edges bored with a plurality of locking holes 1000 and convection holes 1001 and their inner sides formed with a plurality of recessed clasp points (not shown). The two opposite second sheets 101 respectively have one edge extending outward perpendicularly to form a combining member 1010 bored with a locking hole 10100.

The base plate 11 positioned on the inner side of the fixing frame 10 is rectangular, made of galvanized iron, spongy iron, aluminum-magnesium alloy, Teflon, stainless steel or carbon, and shaped by pressing and bending and formed with a thickness between 0.2 mm and 10 mm. The base plate 11 has its peripheral edge perpendicularly extended and bent toward one side to form a narrow sheet 110, in which these side surfaces form an accommodating space 111, and side edges having a plurality of projecting points 1101 for corresponding engagement with the recessed clasp points on the inner side of the fixing frame 10 for securing the base plate 11 together with the fixing frame 10.

The two LED bars 2 are respectively formed from a plurality of high efficiency LEDs 20 connected in series and fixed on an aluminum base plate 21 by way of soldering. The two LED bars 2 are respectively positioned on the inner wall of the two opposing narrow sheets 110 of the base plate 11 to provide a light source for this invention. The LEDs 20 are first connected in parallel with a zener diode 22 and then connected in series, or, during production, the LEDs 20 are first connected in parallel with a zener diode 22 and then packaged. Thus, when any one of the LEDs 20 on the LED bars 2 causes trouble, electric current 20 can continuously flow via the zener diode 22 to insure the other LEDs 20 work normally.

The light guide plate 3 is received in the accommodating space 111 of the base plate 11 and disposed at positions where the two LED bars 2 are located. The light guide plate 3 is transparent, having two opposite side edges respectively being light-transmitting and facing the LED bar 2, and the other two opposite side edges respectively being opaque. The light guide plate 3 can have its inner and outer sides respectively provided with some optical dots to make up a dot face 30 by thermal pressing, injection, inkjet or printing, and the optical dots on the other side of the light guide plate 3 are processed to form a smooth light guide face 31.

The reflecting sheet 4 is stuck onto the dot face 30 of the light guide plate 3.

The optical film 5 contains a diffusion sheet 50, an upper prism sheet 51 and a lower prism sheet 52 that are positioned on the light guide face 31 of the light guide plate 3. The light guide plate 3 and the optical film 5 respectively have their interiors processed to form specific-shaped apertures for adjusting the light refracting angles attained by the light guide plate 3 and the optical film 5.

The power supply unit 6 is provided with a distributor 60 on the rear side of the base plate 11 of the positioning frame base 1 for receiving and properly shunting AC/DC power. The distributor 60 is connected with two sets of electrical wires, which are respectively connected to two DC conversion circuits via an aerial adapter 61 to output DC power for supplying the LED bars 2 with electricity. The DC conversion circuits are covered with a box made of insulating gaskets and then placed in the interior of an aluminum square tube 62, and subsequently the square tube 62 has its upper and lower openings respectively sealed with a side plate. The square tube 62 and the side plates can protect the interior circuits from being bumped by external objects. And when the DC conversion circuits operates and produces high temperatures, the aluminums square tube 62 and side plates can quickly dissipate and vent the heat energy to provide effective of heat dissipation.

The plate-shaped protective cover 7 is assembled on the inner side of the positioning frame base 1 and positioned on the front side of the light guide plate 3 (or the optical film 5) for screening and protecting the LED bars 2 and the light guide plate 3 (or the optical film 5), providing water-proofing, filth-resisting and weather-proofing effects. The protective cover 7 can be made of acrylics, PC or PVC augmented with an anti-scratch and anti-filth nano-material to enable the high efficiency LED lamp of this invention to be employed both outdoors and indoors.

The integration frame 8 is disposed on the rear side of the base plate 11 of the positioning frame base 1, and is formed with a shape matching the outline of the fixing frame 10. The integration frame 8 is made of galvanized iron, spongy iron, stainless steel, or a plastic material like acrylics or PVC, and is shaped by sheeting, casting or plastic injection and formed with a thickness between 0.2 mm and 1 mm. The integration frame 8 has its opposing long edges respectively bored with a plurality of locking holes 80 corresponding to the locking holes 1000 of the first sheet 100 of the fixing frame 10 and its opposing short edges respectively protruding out to form an extension member 81 corresponding to the combining member 1010 of the fixing frame 10 and bored with a locking hole 810. Thus, the combining members 1010 of the fixing frame 10 and the extension members 81 of the integration frame 8 can be locked together by locking members 82 so that the integration frame 8 integrates the base plate 11, and the distributor 60 and the square tube 62 of the power supply unit 6 and firmly positions them on the fixing frame 10.

In assembling the high efficiency LED lamp of this invention, firstly, the two LED bars 2 are respectively installed on the inner wall of the sheet 110 on the opposite ends of the base plate 11 and then the light guide plate 3 is positioned on the inner side of the base plate 11 and clamped between the two units of LED bars 2, letting the light-emitting portion of the two LED bars 2 respectively face the light-transmitting edges of the light guide plate 3. Next, the reflection sheet 4 is pasted onto the dot face 30 of the light guide plate 3, and the diffusion sheet 50, the upper prism sheet 51 and the lower prism sheet 52 of the optical film 5 are pasted in order on the light guide face 31 of the light guide plate 3, and then the protective cover 7 is assembled on the front side of the optical film 5. Subsequently, the base plate 11 together with the light guide plate 3 and the optical film 5 and the protective cover 7 are together assembled on the inner side of the fixing frame 10 of the positioning frame base 1 to have the projecting points 1101 of the base plate 11 respectively engaged with the recessed clasp points of the fixing frame 10. Afterwards, the two square tubes 62 having DC conversion circuits disposed in the interior are respectively installed on the inner opposing sides of the fixing frame 10, and the distributor 60 is positioned on the rear side of the base plate 11, and then the locking members 82 are respectively inserted through the locking holes 10100 on the opposite sides of the fixing frame 10 to firmly fix the square tubes 62 into position. Lastly, the square tubes 62 and the distributor 60 of the power supply unit 6 are set in position by the integration frame 8 and then the locking members 82 are respectively inserted through the locking holes 80, 810 of the integration frame 8 and the locking holes 1000, 10100 of the fixing frame 10 to threadably lock the integration frame 8 and the fixing frame 10 together to finish assembly of the high efficiency LED lamp.

Thus, after the LED bars 2 receive the DC power converted and supplied by the DC conversion circuit and provide a light source, the propagation direction of the light source will be guided by the light guide plate 3 and the reflection sheet 4 on one side of the light guide plate 3. Simultaneously, the diffusion sheet 50 of the optical film 5 will function to evenly distribute the light, and the upper and the lower prism sheet 51, 52 will function to concentrate the dispersed light and emit light in a proper direction, thus able to increase the lighting brightness and attain a complete lighting effect.

Figure 4:
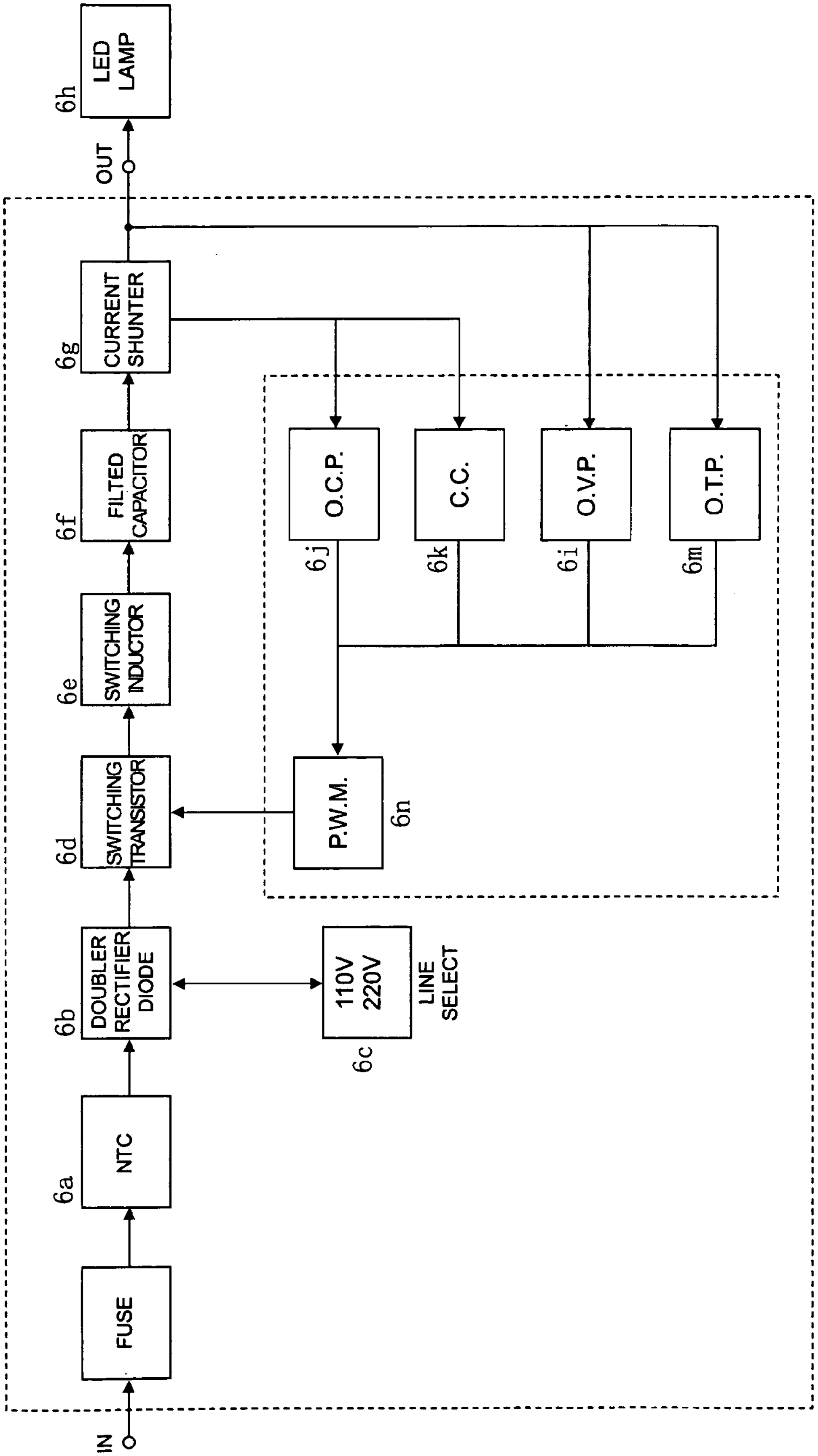
FIG. 4 is a circuit conversion diagram for A.C. and D.C. power in the present invention.

Referring to FIG. 4 (a flow chart of a DC conversion circuit), since the luminous brightness of an LED is in direct proportion to the electric current flowing through the LED, the LEDs 20 of the invention are connected in series for matching with the high-voltage and low-current DC power supplied by the power supply unit 6 to enable the LEDs 20 to radiate with maximum efficiency. The DC conversion circuit that outputs a constant current will gradually output a steady current in accordance with the following flow process:

After passing through a fuse, external AC/DC power will first flow through a current surge protective circuit (NIC) (**6*a* in FIG. 4) to have the circuit temperature detected by a thermistor to protect against power overload. Then, the AC flows to a double rectifier diode (6*b* in FIG. 4) for conversion into DC power to have the voltage, output by the double rectifier diode, adjusted through the line voltage of a line select (6***c* in FIG. 4). After being rectified, the DC power gets to a switching transistor (6*d* in FIG. 4) for lowering the voltage input into the switching transistor to become a voltage needed for output. After having the voltage lowered by the switching transistor (6*d* in FIG. 4), the DC power is filtered through the switching inductor of a wave filtering circuit (6*e* in FIG. 4) to get rid of noise produced during switching and then filtered through a filter capacitor (6*f* in FIG. 4) to provide a smooth and steady output. Subsequently, the output voltage is connected to a current shunt (6*g* in FIG. 4) for outputting the steady current to the LED lamp 2 (6*h* in FIG. 4).

When the temperature of the LED gradually increases, the working forward voltage of the LED will gradually decrease and the electric current passing through the LED will increase, influencing the lighting brightness and the service life of the LED. Therefore, the LED lamp of this invention is provided with the DC conversion circuit for adjusting the voltage according to the working temperature of the LED. When the DC conversion circuit detects that the working temperature of the LED is over 60° C., the DC conversion circuit can function in a timely manner to modulate the LED to use a proper working forward voltage value through frequency modulation for stabilizing the current flowing through the LED and keeping the working temperature of the LED at 60° C. so as to maintain the lighting brightness and the service life of the LED.

In addition, the output terminal of the circuit is provided with an overload voltage protective circuit (O.V.P.) (6*i* in FIG. 4) and an overload circuit protective circuit (O.C.P.) (6*j* in FIG. 4) for detecting the feedback compensating circuit made by the overheat protective circuit (O.T.P.) (6*m* in FIG. 4) and the constant-current reference circuit (C.C.) (6*k* in FIG. 4) of a high temperature protective lamp. After circuit compensation, a pulse width modulation circuit (PWM) (6*n* in FIG. 4) will automatically modulate the switching frequency of the switching transistor (6*d* in FIG. 4) for modulating the output current value. Thus, when the current of the LED changes violently due to an unsteady voltage, the power supply unit 6 of this invention can timely modulate output of the current to prevent the LED producing insufficient brightness because of unsteady current.

Figure 5:
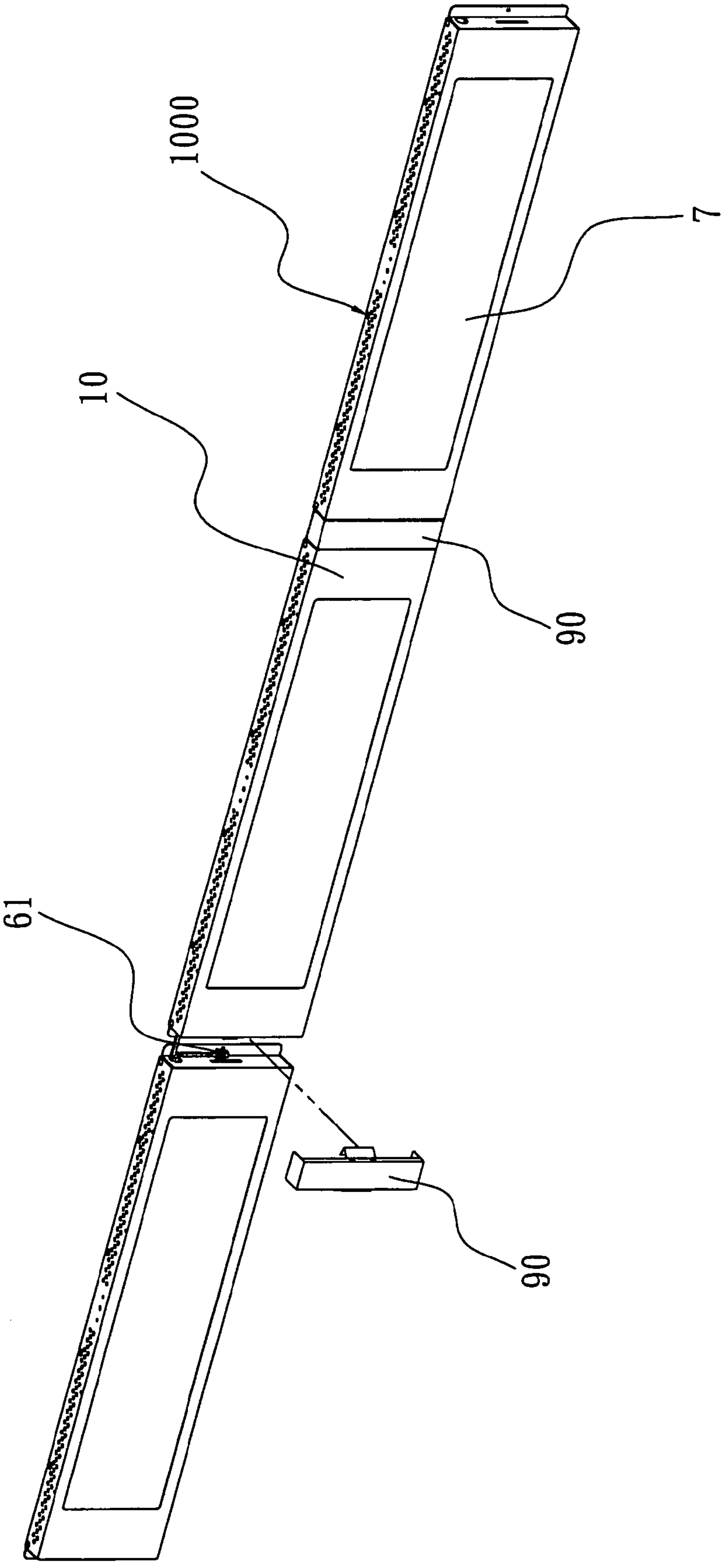
FIG. 5 is a first assembly view of a high efficiency LED lamp of the present invention.
Figure 6:
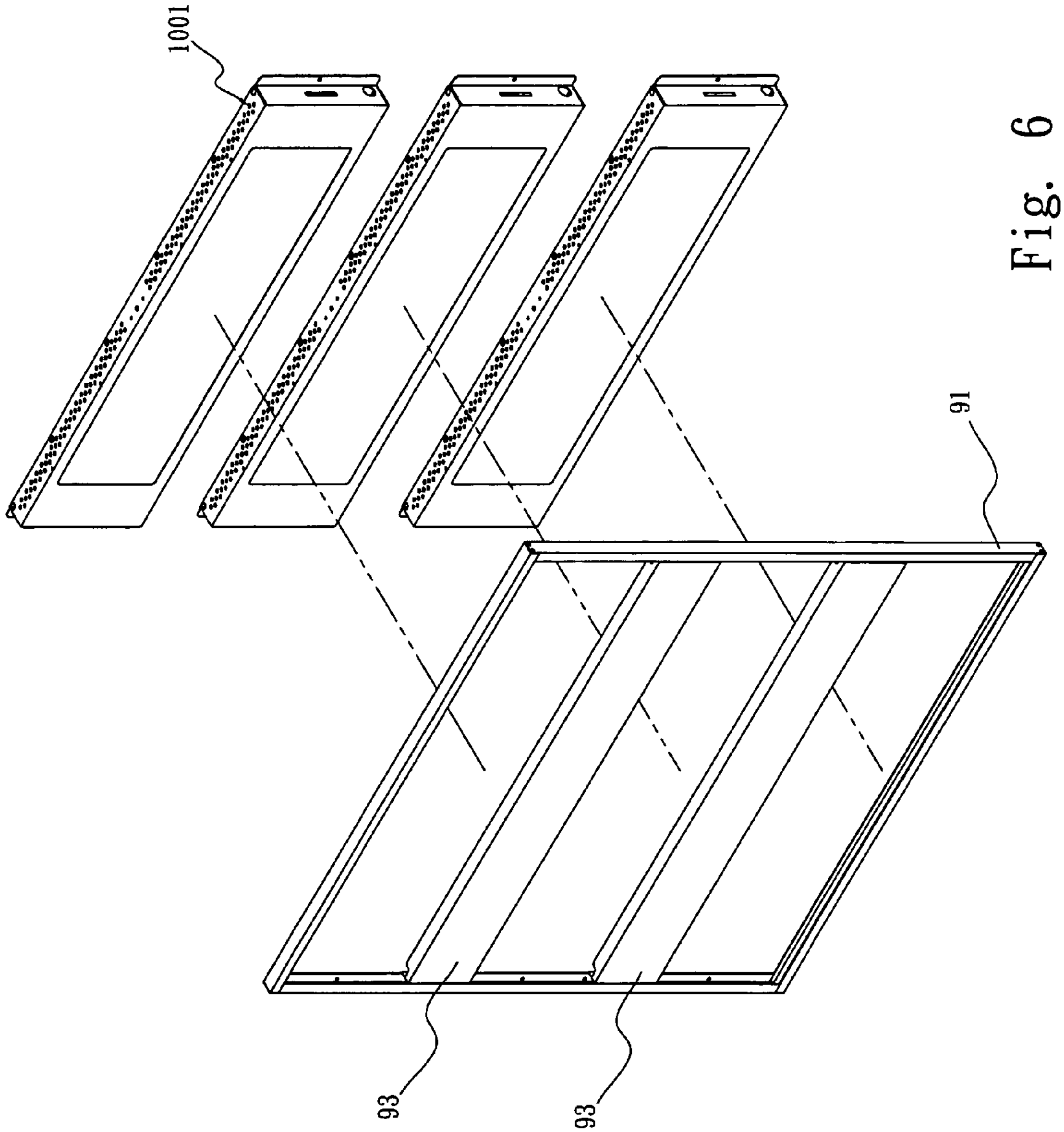
FIG. 6 is a second assembly view of a high efficiency LED lamp of the present invention.
Figure 7:
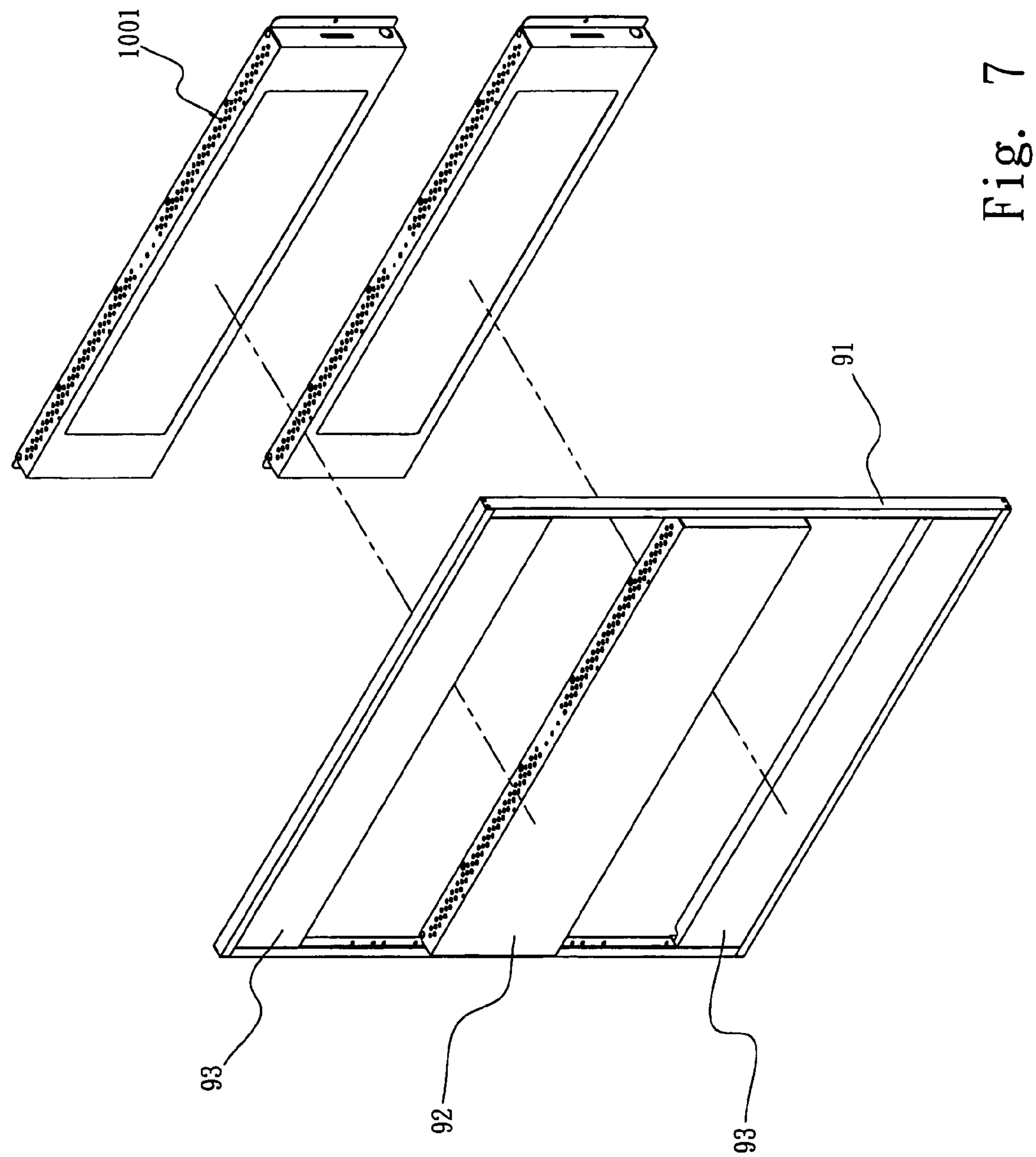
FIG. 7 is a third assembly view of a high efficiency LED lamp of the present invention.
Figure 8:
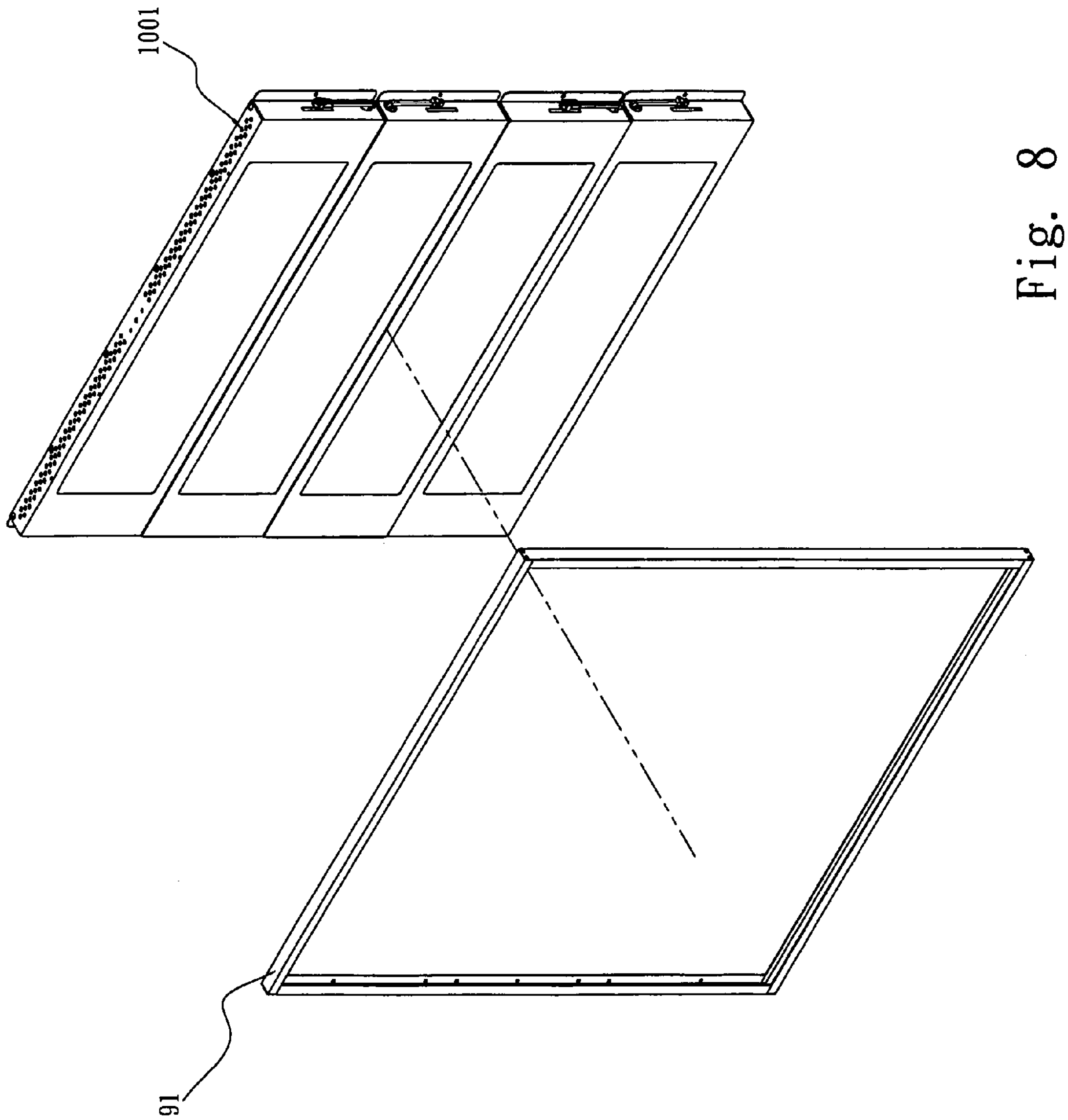
FIG. 8 is a fourth assembly view of a high efficiency LED lamp of the present invention.

In assembly and use, as shown in FIG. 1 and FIGS. 5-8, the high efficiency LED lamp of this invention can be singly installed at a proper location within a space to be used as a common lamp, such as a wall lamp, an advertising lamp and the like, or have several sets of LED lamps connected in series to make up a long bar-shaped lamp, as shown in FIG. 5. A decorative cover 90 can cover the connecting electric wires exposed between every two LED lamps for an aesthetically pleasing effect. The LED lamp of this invention can also be installed within a standard positioning frame 91 installed on a ceiling using the combining members 1010 on opposite sides of the fixing frame 10 leaning against and fixed with the positioning frame 91 on the ceiling. The fixing frame 10 of this invention is designed to have a specific width, which is one fourth of a standard positioning frame 91. In order words, according to practical needs, two to four sets of LED lamps can be optionally juxtaposed in the positioning frame 91 in cooperation with large-sized separating plates 92 and small-sized separating plates 93 to make up a comparatively large light emission face to illuminate a large space, such as a parlor, an office or a classroom. Further, the opposite first sheets 100 of the fixing frame 10 have their side edges respectively bored with numerous convection holes 1001, which are able to increase the heat dissipating effects of the LED lamp of this invention. Therefore, when the LED lamp of this invention is attached to the positioning frame 91 by way of the opposite combining members 1010 of the fixing frame 10, the first sheets 100 of the fixing frame 10 extend from the surface of the positioning frame 91, letting the convection holes 1001 at the side edges of the first sheets 100 communicate with the outside space. Thus, high temperatures produced in the interior of the LED lamp during lighting can be exhausted out through the convection holes 1001 to enable the LED lamp to dissipate heat effectively.

In addition, according to different conditions of environment and space, the optical film 5 of this invention can be arranged in various modes for producing different-angled lighting, as indicated in the following table.

| Mode of arrangement | Lighting angle |
|---|---|
| One diffusion sheet | 120°~180° |
| Two diffusion sheets | 95°~155° |
| Three diffusion sheets | 67.5°~127.5° |
| One diffusion sheet + one prism sheet | 85°~145° |
| One diffusion sheet + one prism sheet + one prism sheet | 47.5°~107.5° |
| One diffusion sheet + one prism sheet + one diffusion sheet | 57.5°~117.5° |
| One diffusion sheet + one prism sheet + one prism sheet + one diffusion sheet | 30°~80° |

This table shows that when the LED lamp of this invention is installed at a height of 2.5 meters, different arranging modes of the optical film 5 will produce different lighting angles.

When only one diffusion sheet of the optical film is used, the lighting angle is 120°~180°; when three diffusion sheets are used, the lighting angle becomes 67.5°~127.5°; when one diffusion sheet and one prism sheet are used, the lighting angle attains 85°~145°, and when one diffusion sheet, one prism sheet, another prism sheet and another diffusion sheet of the optical film are used, a comparatively concentrated lighting angle of 30°~80° can be obtained.

Thus, according to the foresaid different arranging modes of the optical film 5, installment of the LED lamp of this invention in a space can be designed differently. For instance, if two sets of the LED lamps are installed in the positioning frame on a ceiling 250 meters above the ground, and the LED lamp is provided with three diffusion sheets, the lighting angle of the LED lamp, measured from the ground, is 125°, the illumination is 200 lux and the total lumen value is 4800. If four sets of the LED lamps are assembled in the positioning frame on a ceiling 250 meters above the ground, and the two sets of LED lamps at the opposite sides are respectively disposed with only one diffusion sheet and the central two sets of LED lamps are respectively disposed with one diffusion sheet and one prism sheet, the lighting angle of the LED lamp, measured from the ground, is also 125°, but the illumination becomes 403~1000 lux and the total lumen value is 9600.

In summary, the arrangement modes of the optical film of the LED lamp of this invention can be adjusted in accordance with space, height and lighting requirements to attain different lighting angles, and is able to achieve a maximal lighting effect.

While the preferred embodiment of the invention has been described above, it will be recognized and understood that various modifications may be made therein and the appended claims are intended to cover all such modifications that may fall within the spirit and scope of the invention.

I claim:

1. A high efficiency LED lamp comprising:

a positioning frame base having a fixing frame and a base plate;

said fixing frame being a rectangular frame having peripheral edge portions bent inwardly forming two opposing first sheets and two opposing second sheets, said fixing frame forming a cavity, each said second sheet having an edge portion bent outwardly forming a combining member;

said base plate having its peripheral edge portions bent to form narrow sheets and defining an accommodating space, wherein said base plate is disposed on an inner side of said first and second sheets of said fixing frame;

LED bars respectively each composed of a plurality of LEDs soldered onto a respective plate, said LED bars attached to inner walls of said narrow sheets of said base plate of said positioning frame base;

a light guide plate including a transparent plate having a dot pattern formed on a major side surface and a light guide emission face formed opposite the dot pattern, said LED bars positioned along the edge of the light guide plate; wherein the accommodating space of said base plate receives said light guide plate with said LED bars; and a power supply unit disposed at a rear side of said base plate of said positioning frame base, said power supply unit including a distributor for receiving and properly shunting AC/DC power, said distributor being connected to a DC conversion circuit for outputting DC power to said LED bars.

2. The high efficiency LED lamp as claimed in claim 1, wherein said first sheet of said fixing frame has an inner side formed with a plurality of recessed clasp points, and said narrow sheet of said base plate has a side formed with projecting points for corresponding engagement with said recessed clasp points.

3. The high efficiency LED lamp as claimed in claim 1, wherein said first sheet of said fixing frame has side edge bored with a plurality of convection holes for dissipating heat.

4. The high efficiency LED lamp as claimed in claim 1, wherein a reflection sheet is disposed on one side of said major side surface of said light guide plate.

5. The high efficiency LED lamp as claimed in claim 1, wherein an optical film is disposed on one side of said light guide emission face of said light guide plate.

6. The high efficiency LED lamp as claimed in claim 1, wherein a protective cover is assembled on the inner side of said positioning frame base and the front side of said light guide plate.

7. The high efficiency LED lamp as claimed in claim 1, wherein an integration frame is set at a rear side of said positioning frame base and has opposing end edges respectively extending outward to form an extension member corresponding with said combining member of said fixing frame, said combining members and said extension members coupled together with locking members.

8. The high efficiency LED lamp as claimed in claim 1, wherein said DC conversion circuit of said power supply unit includes a current surge protective circuit, a double rectifier diode, a switching transistor, a switching inductor, a filter capacitor, a current shunt, an over voltage protective circuit, an over current protective circuit, an over heat protective circuit, a constant current reference circuit and a pulse width modulation circuit, said circuits electrically connected for supplying said LED with steady current.

9. The high efficiency LED lamp as claimed in claim 1, wherein LEDs on said LED bars are connected in series.

10. The high efficiency LED lamp as claimed in claim 9, wherein said LEDs are connected in series with a zener diode.

11. The high efficiency LED lamp as claimed in claim 9, wherein said LEDs are first connected in parallel with a zener diode and then connected in series.

* * * * *